Nov. 2, 1954 G. C. ORTMAN 2,693,127

SOUND SYNCHRONIZING SYSTEM

Filed March 16, 1951

2 Sheets-Sheet 1

INVENTOR
Gordon C. Ortman

BY Robert M. Dunning

ATTORNEY

INVENTOR
Gordon C. Ortman
BY Robert M. Dunning
ATTORNEY 2,693,127

SOUND SYNCHRONIZING SYSTEM

Gordon C. Ortman, St. Paul, Minn.

Application March 16, 1951, Serial No. 215,983

9 Claims. (Cl. 88—16.2)

This invention relates to sound synchronizing systems and pertains more particularly to systems for synchronizing a film with the sound produced from a magnetic tape.

With the advent of long playing magnetic tape recorders, it has now become popular to record lectures and commentaries of various sorts on the tape for playing along with illustrated slides and motion pictures of the silent type. However, without appropriate control the illustrated slides must be changed manually as the vocal description progresses, and when motion pictures are utilized the speeds of the separate motors driving the film and the recorder tend to get out of synchonism with each other, thereby necessitating manual adjustment. Also, differential expansion coefficients between the tape and film materials frequently cause discrepancies in their length, thus creating an additional source of synchronization error. Similarly, it may at times become necessary to splice either the film or tape which likewise alters the length of one with respect to the other, which of course adversely affects the synchronization. Accordingly, it is an object of the instant invention to obviate the foregoing difficulties, providing instead a completely automatic arrangement for maintaining the proper synchronization between the sound and projected pictures.

It is an object of the invention to provide synchronizing apparatus that will lend itself readily to adaptation to existing recording playback mechanisms and projecting equipment.

A further advantage of the invention resides in the feature that the user may conveniently apply the conductive coatings for producing the desired synchronization.

Another object of the invention is to provide apparatus of the referred to character which is relatively inexpensive to produce and which is easy to operate.

It is also within the contemplation to have either the tape or the film, which ever is of shorter time duration, automatically start up a second mechanism of the same character, this being at the end of said film or tape, so that a substantially continuous program may be presented.

Briefly, my invention contemplates coating a magnetic tape with strips of an electrically conductive composition at spaced locations which strips are consecutively embraced by a pair of contact brushes as the tape is continuously moved over a magnetic pick-up element connected to an associated amplifier. Where motion picture film is to be synchronized, similar strips of conductive material are placed on the film at preferred points in a pattern corresponding to the strips on the tape. Completion of an electrical circuit through the respective brushes serves to produce the timed electrical impulses which control the tape and film driving motors. Where a slide projector is employed, the completion of a circuit through the brushes associated with the magnetic tape functions to move a new slide or film frame into position by virtue of a solenoid contained in the brush circuit and connected with the slide changing mechanism.

The various objects and advantages of this invention will be more apparent upon considering the following detailed description of certain embodiments of the invention as illustrated in the accompanying drawings, in which:

Figure 1 is a schematic representation of the invention as applied to a motion picture film;

Figures 2, 3, and 4 show various forms of brushes and conductive strips suitable in connection with a magnetic tape;

Figure 1:
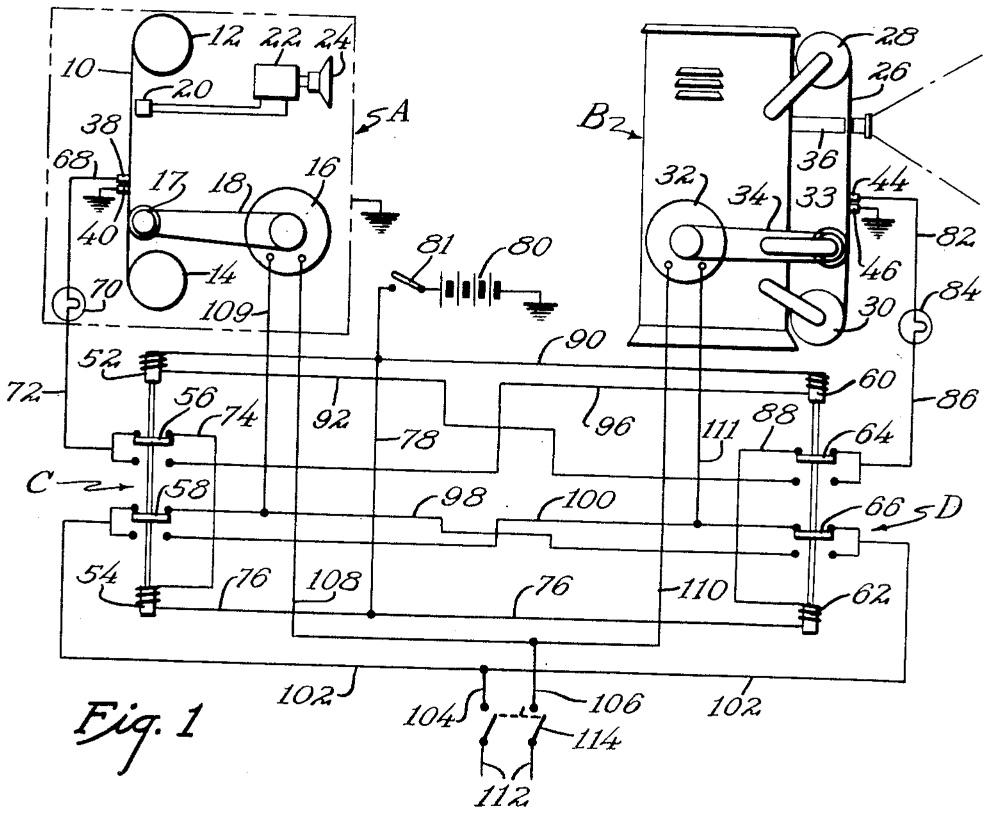

Referring now to Figure 1 of the drawings, it will be seen that A represents a tape recorder, the recorder A including a magnetic tape 10 mounted on a pair of rolls or reels 12 and 14. The reel 14 is suitably driven by an electric motor 16, capstan 17, and driving belt 18 to thereby move the tape 10 past a magnetic pick-up element 20. A suitable amplifier 22 is connected to the pick-up 20 and the amplifier 22 is in turn connected to a speaker 24. In the arrangement pictured, the tape 10 is of a material, such as paper or plastic, having a magneticable coating of ferric oxide on the side thereof adjacent the pick-up element 20.

A motion picture projector B includes a continuous film 26 mounted on a pair of rotatable reels 28 and 30. The film is suitably driven by an electric motor 32, capstan 33, and belt 34 in a known manner to produce an intermittent movement of the film. In this way the film 26 is intermittently moved past a lens 36 which causes an image to be projected upon a screen. Thus far, the recorder A and the projector B are of conventional construction, the details of which form no part of my invention.

Figures 2, 3, 4, 5, 6:
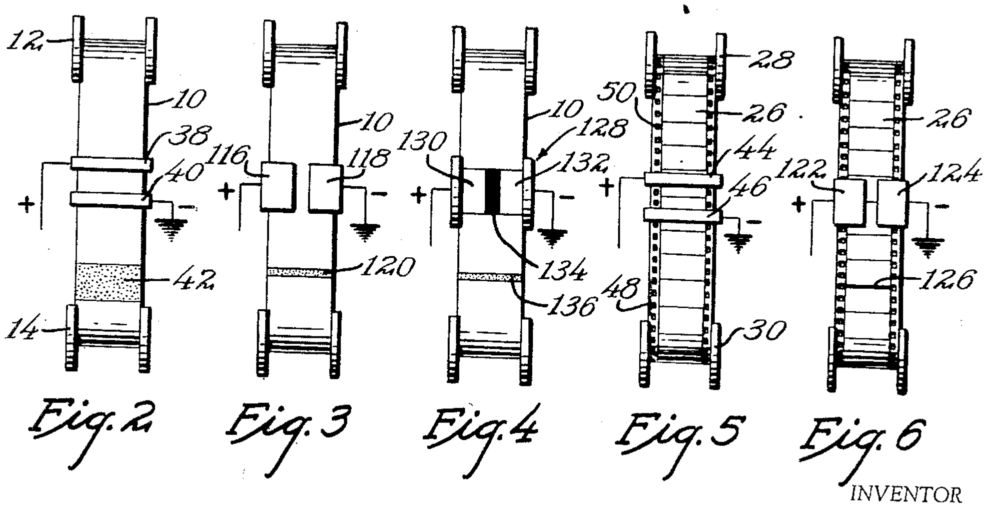
Figures 5 and 6 are similar to Figures 2 and 3, but show the brushes in associated relation with a motion picture film.

In order to effectuate the objects of my invention, I employ a pair of spaced brush contacts 38 and 40 in wiping contact with a plurality of strips 42 of an electrically conductive material, such as silver nitrate, silver chloride, which may be sprayed, painted, stamped, or otherwise adhered to the surface of the tape 10, or if desired, a short length of conductive tape may be spliced into the tape at the proper intervals. The brushes 38 and 40 depicted in Figure 1 are also shown in Figure 2 and it will be observed that the brushes are slightly spaced from each other in the direction of tape movement, the strip 42 being of sufficient length in that direction so as to be simultaneously contacted by both the brushes as the strip 42 passes therebeneath. The purpose to be accomplished by such an arrangement will be presently made more apparent.

A second pair of brushes 44 and 46 is similarly positioned with respect to the film 26, the film likewise having a plurality of spaced conductive strips 48 thereon. Should the strips 48 be of an opaque conductive substance the strips may be so located as not to offer any interference with the pictures carried on the film. One such way is to position the strips as illustrated in Figure 5, the single strip there shown being mounted exteriorly of one of the rows of conventional perforations 50 into which the teeth of a driving cog wheel project in known manner. However, in actual practice the strip may extend onto the central film portion without being noticeable to the audience, this being by virtue of the relatively fast rate of film movement.

The control of the motors 16 and 32 is accomplished by means of a pair of double acting relays C and D. The relay C is provided with two windings 52 and 54 for urging two contact members 56 and 58 in either of two directions to cause selective completion of hereinafter designated circuits. The relay D, which may be of identical construction with the relay C, has a pair of opposed windings 60 and 62 for actuating a pair of contact members 64 and 66 into oppositely directed positions. Both of the relays C and D are of the snap action type and each will remain in the position into which it has been attracted by one of the solenoid windings 52 or 54, or by one of the windings 60 or 62, until the other winding has been energized to attract the relay back into its respective first position.

A conductor 68 connects the brush 38 to an indicating light 70 and a conductor 72 connects the light to the relay C. The relay C also has an internal conductor 74 connecting with the solenoid winding 54, the solenoid winding in turn being connected to a conductor 76 extending to another conductor 78 which is connected to a source of voltage, as a battery 80 via a switch 81. The battery 80 may be suitably grounded, as shown, for connection with the brush 40, also shown grounded, or there may be a direct electrical connector extending between the battery 80 and the brush 40.

A conductor 82 corresponding to the conductor 68 connects the brush 44 to a second indicating light 84 and a conductor 86 leads from the light to the relay D. An internal conductor 88 is contained within the relay connecting with the solenoid winding 62, the winding 62 in turn being connected to the conductor 78 via the conductor 76.

The winding 52 is connected to the conductor 78 by means of a lead 90, the lead 90 also being connected with the solenoid 60. The solenoid 52 is joined to the relay D by a wire 92 and the solenoid 60 is connected to the relay C by a conductor wire 96. Interconnecting the relays C and D is a plurality of wires 98, 100, and 102, the wire or conductor 102 connecting with one line 104, and another line 106 is connected directly to the motor 16 via a conductor 108 and to the motor 32 via a conductor 110. The other side of the motor 16 is connected to the line 98 by means of a conductor 109, while a similar conductor 111 connects the motor 32 to the line 100. The lines 104 and 106 are intended to be connected to a suitable source of potential 112 by means of a double bladed switch 114.

For a better understanding of the foregoing circuit wiring and the manner in which it cooperates to synchronize the sound film, the recorder A with the pictures from the projector B, reference should now be had to the following operational sequence:

After the tape 10 and the film 26 have been properly inserted into the recorder A and the projector B, the first conductive strip 42 on the tape 10 and the first conductive strip 48 on the film may, if desired, be moved into corresponding positions. To facilitate this initial positioning of the strips 42 and 48, recourse may be had to the lights 70 and 84 which will both be lighted upon closure of the switch 81 when both of the first strips 42 and 48 are properly situated with respect to each other. With respect to the light 70 it will be understood that a closed circuit will exist by way of the battery 80, the switch 81, the conductors 78, 76, the solenoid winding 54, the conductor 74, the conductor member 56, the conductor 72, the light 70, the conductor 68, the brush 38, the first conductive strip 42, the other brush 40 and via grounded connection back to the battery 80. A similar closed circuit may be traced through the light 84 and its serial circuit which also includes the battery 80. While the strips 42 and 48 remain stationary beneath the brushes, the relays C and D will reciprocate back and forth, first the solenoid windings 54 and 62 being energized to actuate the contact members 56, 58 and 64, 66 in one direction and then the solenoids 52 and 60 becoming energized to actuate the said contact members in a reverse direction. This feature will become more apparent later, it only being necessary at this point to understand that the lights may serve as an indication that the tape 10 and the film 26 are properly aligned initially.

It will of course be understood that initial manual adjustment is not absolutely necessary, for the tape recorder playback mechanism A and the projector B will automatically align themselves after a run-off of the "leaders" or unimpressioned sections of tape and film. The chief advantage in using the lights 70 and 84 resides in the fact that the system may be prepared in advance of a public demonstration, thereby presenting a more professional appearance.

Assuming now that the relays C and D are in the upper position shown in Figure 1 and that both the switches 81 and 114 have been closed, it will be observed that both the motors 16 and 32 begin to rotate, thus removing the first strips 42 and 48 from beneath their respective brushes. The circuit energizing the motor 16 includes the conductor 102, the contact member 58, the conductor 109, and the conductor 108, while the circuit energizing the motor 32 includes the conductor 102, the contact member 66, the conductor 111 and the conductor 110.

With the motors 16 and 32 running, the tape 10 and the film 26 will of course be put in motion and a second or succeeding conductive strip 42 and 48 will move toward their respective brush contacts 38, 40 and 44, 46. Of course it could be that the tape 10 has shrunk since recording the sound, or that a section has been removed by splicing, both of which situations would create the same result as a faster running motor. But for the sake of illustration, suppose the motor 16 runs faster than the motor 32 to thereby bring the next strip 42 into embracive alignment with its associated brushes 38 and 40. This will cause the winding 54 to be energized via the conductors 78, 76, 74, 72, 68, the contact member 56 being in its uppermost position to bridge the conductors 72 and 74. The energization of the winding 54 will immediately attract the relay into its lowermost position to break the circuit between the conductors 72 and 74. The motor 16 will simultaneously be de-energized in that the contact member 58 is moved downwardly with the contact member 56 to open the motor circuit between the conductors 98 and 102. The motor 16 therefore stops and literally waits for the lagging motor 32 to catch up.

When the motor 32 moves the next or second strip 48 beneath the brushes 44 and 46 the winding 62 becomes energized to attract the relay D into its lowermost position to break the motor circuit at the contact member 66, the contact member 66 then bridging the conductors 98 and 102. Bridging the conductors 98 and 102 will cause the motor 16 to again start, for a circuit will be completed through the conductor 102, the contact member 66 and the conductors 98, 109 and 108. At first sight, it might be thought that interruption of the circuit containing the conductors 100 and 102 by the downward movement of the contact member 66 would cause the motor 32 to become de-energized, but such a result does not occur because the motor 32 continues to receive power via the conductor 102, the contact member 58, and the conductors 100, 111 and 110, it being remembered that the relay C has been previously attracted to its lowermost position to bridge the conductors 102 and 100 by means of the contact member 58.

Should the motor 32 run too fast, or due to shrinking or splicing of the film, then the brushes 44 and 46 will abridge a strip 48 before the next strip 42 is abridged by the brushes 38 and 40. Under these assumed conditions, the winding 62 will be energized to break the circuit of the motor 32 at 66 to de-energize said motor. The motor 32 will wait until the strip 42 has been moved beneath the brushes 38 and 40 whereupon the relay C will move downwardly to close the circuit including the conductors 100 and 102 by way of the contact member 58 to again start the motor 32.

If it should happen that the strips 42 and 48 reach their respective brushes simultaneously, it will be understood that both relays C and D will move downward, but that both of the motors 16 and 32 will continue to run in that the contact member 58 will now bridge the conductors 100 and 102 to supply power to the motor 32, while the contactor 66 will bridge the conductors 98 and 102 to keep the motor 16 energized.

From the foregoing description it is believed that it will be readily apparent that the apparatus will continue to operate in cyclic sequence as each succeeding strip 42 or 48 is moved into registry with the brushes associated with the tape 10 and the film 26. Actually it is intended that the tape 10 and the film 26 be driven at substantially uniform speeds, so that they will only become slightly out of step with each other between straddling contacts of the brushes with the conductive strips. In this way the leading or fast motor will only be de-energized for a moment before the other motor catches up, for the most part being unperceptible to the eye or ear, as the case may be. Thus as a practical matter, it will be appreciated that the tape 10 and the film 26 are maintained in synchronism with each other, the momentum of the driving motors normally serving to keep the more advanced motor in motion.

In Figures 3 and 6 I have illustrated slightly different brush and conductive strip arrangements for the tape and film. Figure 3 depicts a pair of brushes 116 and 118 situated transversely of the film 10. When arranged in this fashion it will be apparent that the conductive strip may be quite narrow as shown at 120. An identical arrangement is shown in Figure 6 for the film, a pair of brushes 122 and 124 embracing the film surface for contact with a conductive strip 126 that may be sufficiently narrow as to lie between two picture frames without offering even the slightest interference with the image projected thereby onto the screen. In Figure 4 a still different modification is depicted, an idler wheel 128 constituting the brushes. Such a wheel is usually employed with tape recorders for aiding in holding the tape in proper position. In this particular instance, I propose to make the wheel of several parts 130, 132, 134. The sections 130 and 132 are electrically conductive, being preferably of metal, while the interposed section 134 is an electrical insulation material, such as mica or fibre. A conductive strip 136 is also employed as in the preceding embodiments. It will be understood that such an idler wheel may also be used satisfactorily with the film 26.

It is also within the province of this invention, as previously indicated, to adapt my basic scheme to the operation of projectors or magic lanterns utilizing slides or film of the still type. With a view to providing such an adaptation, reference should now be had to the embodiment pictured in Figure 7.

Figures 7, 8:
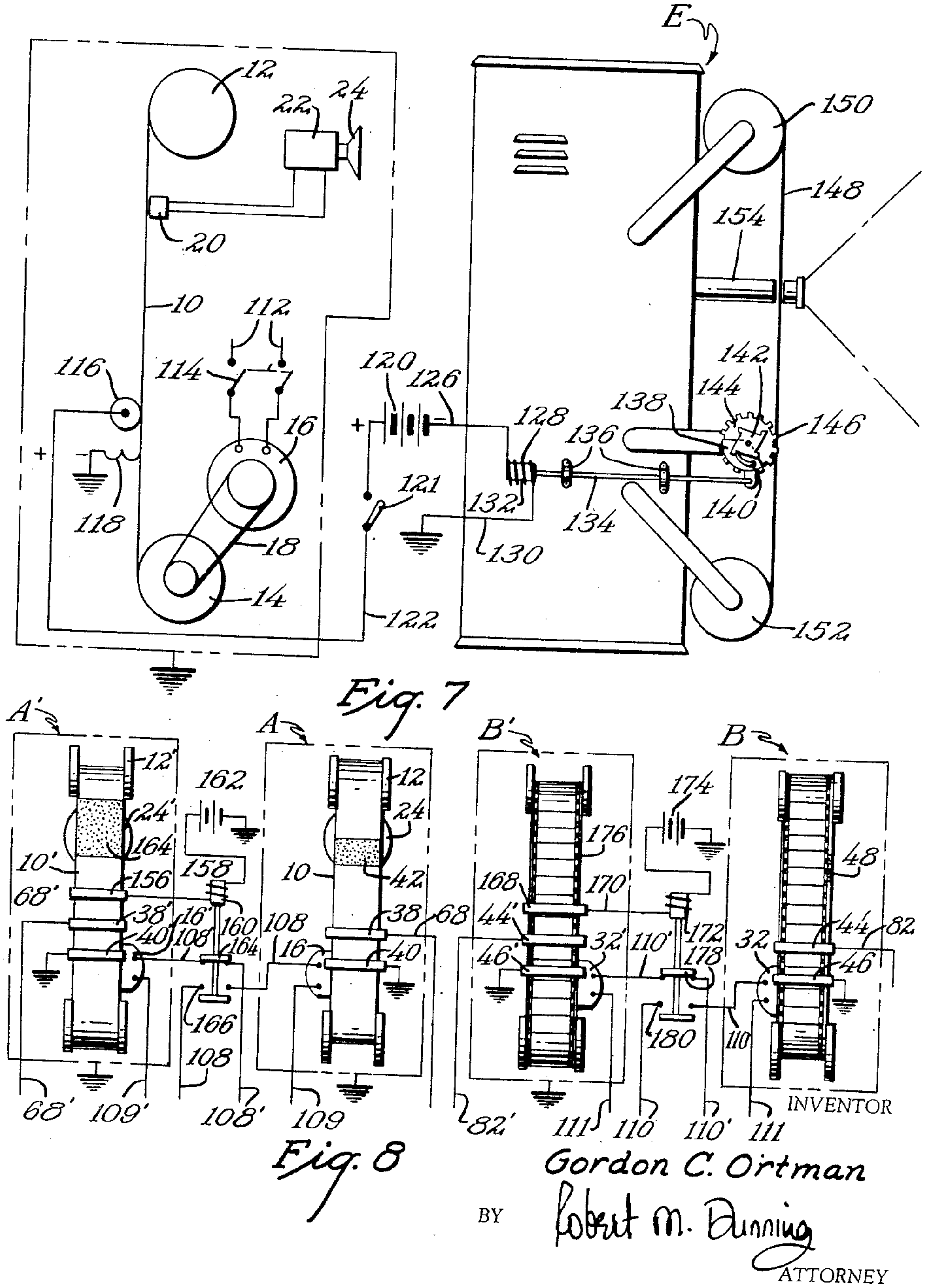
Figure 7 is a schematic representation of the invention as applied to a still or slide type of projector.
Figure 8 is another schematic portrayal of the invention, similar in basic design to Figure 1, but pertaining to a dual system.

The tape recorder in Figure 7 is of the same conventional construction as that in Figure 1. Therefore, parts having the same design as in the first embodiment have been assigned the same reference numerals. In the present embodiment, however, a different pair of brushes 116 and 118 is employed, the brush 116 being in the form of an idler wheel and the brush 118 being in the shape of a doubly curved spring. Thus, it will be appreciated that these brushes correspond in function to the brushes 38 and 40 respectively, and serve to embrace the conductive strip 42 carried by the tape. Actually any of the brush arrangements depicted in Figures 1–6 could be used.

It will be observed that the motor 16 is presently connected for continuous operation once the switch 114 has been closed, the relays C having been omitted in this modification.

The brush 118 is suitably grounded and the brush 116 is connected to a source of potential, such as a battery 120 by a conductor 122, such conductor including a switch 121. Another conductor 126 extends from the battery 120 to a solenoid winding 128 and the other side of the winding 128 is grounded by a conductor 130.

The winding 128 is desirably carried on one side of a still picture projector E, the armature 132 of the solenoid winding having connection with a reciprocable shaft 134 mounted for reciprocation by a pair of clips 136, secured to the side of the projector E.

The other end of the reciprocable shaft 134 is connected to an eccentric 138 on which is carried a pawl 140 engageable with a ratchet 142. The ratchet 142 is drivingly connected to a cog wheel 144 having teeth 146 meshing with a series of perforations in a film 148. This film is of the still picture type, the film consisting of a series of still picture frames of known type. The film is suitably mounted on a pair of reels 150 and 152 and extends past a lens 154.

The operation of this relatively simple system is thought to be obvious from the foregoing description. Once the switch 114 is closed the motor 16 will be energized and will cause the tape 10 to be moved past the pick-up member 20 and the brushes 116 and 118, as in the previous embodiment. The conductive strips 42 are so spaced as to appear beneath the brushes 116 and 118 at the particular moment that a change in the projected picture from the film is desired. With the switch 124 closed it will be observed that the wiping of the brushes 116 and 118 against a conductive strip 42 will complete a circuit through the conductor 122, the switch 124, the battery 120 and the solenoid winding 128 to thereby energize said winding and actuate the pawl 140 and ratchet 142 to move a new film frame into position in front of the lens 154. It will of course be understood that the ratchet 142 is designed to rotate a predetermined amount such as will cause the cog wheel 144 to move the film 148 the distance of one film frame. The pawl and ratchet mechanism is suitably spring biased so that it will return the shaft 134 and the connected armature 132 to their original position for a succeeding energization of the winding 128 when the next strip 42 becomes aligned with the brushes 116 and 118. Accordingly, it will be appreciated that the film will be continued to be moved at proper intervals in timed relation with the sound derived from the tape 10.

Where the program is of considerable length I propose to automatically start up a second tape recorder or motion picture projector immediately upon the complete running off of the first tape or film, or should the tape and film be ended simultaneously then both a second recorder and projector may automatically be placed in active service. Referring specifically to Figure 8, it will be assumed that a recorder A′ is nearing the end of its tape 10′. One convenient way of starting up the succeeding recorder A, which is of identical construction as the recorder depicted in Figure 1, is to employ a third brush 156 completing a circuit through a conductor 158, a solenoid winding 160 and a source of electrical power, such as a battery 162, the brush 40′ and an enlarged conductive strip 164. It will be observed that the strip 164 is longer than the heretofore mentioned strip 42, this being so that it will bridge both of the brushes 40′ and 156. Since a conductive strip 164 is only used adjacent the end of the tape 10′, the solenoid 160 will only be energized when the end of the tape 10′ is approached.

Upon energization of the winding 160 in the foregoing manner the power circuit to the motor 16′ will be broken at 164 and since the contactor at 164, which is actuated by the solenoid 160, is moved upwardly a snap action mechanism is intended to retain the contactor 164 in its raised position. The power circuit leading to the motor 16 is simultaneously closed at 166 to energize the motor 16 via the conductor 108.

In analyzing the recorders A′ and A, it will be appreciated that their only difference from each other resides in the fact that a third brush 156 is utilized for straddling the larger conductive strip 164, such strip 164 appearing only near the end of the tape 10′, which tape is otherwise provided with a plurality of conductive strips 42 previously elaborated upon.

A similar arrangement is employed with respect to the projectors B′ and B. In this instance a third brush 168 completes a circuit through a conductor 170, a winding 172, a source of potential 174, the brush 46′ and an elongated conductive strip 176 when said conductive strip 176 has moved beneath the brushes 46′ and 168. Completion of the circuit through the brushes 46′ and 168 causes energization of the winding 172 with the concomitant result that the circuit of the motor 32′ is broken at 178 and the circuit of the motor 32 is closed at 180 to thereby start the motor 32. The manner of operation is thus the same for both the projectors B′, B and the recorders A′, A.

In describing the arrangement pictured in Figure 8 only enough of the circuit has been referred to in order to provide an understanding as to how the system of Figure 1 can be modified and embellished upon to provide for a substantially continuous presentation. Such a modification is desirable because of the physical limitations imposed upon the lengths of the tapes and films customarily used, thereby avoiding any splicing together of tapes and films of usual length, which in many instances would result in rolls of unwieldy size not readily accommodated on existing apparatus. Therefore, the system of Figure 8 will find its optimum utility where lengthy programs are to be delivered.

In accordance with the patent statutes, I have described the principles of construction and operation of my sound synchronizing systems, and while I have endeavored to set forth the best embodiments thereof, I desire to have it understood that these are only illustrative thereof and that obvious changes may be made within the scope of the following claims without departing from the spirit of my invention.

I claim:

1. A system for synchronizing sound with a moving film comprising a sound producing tape having an electrically conductive substance at spaced points therealong, a pair of spaced brushes for contacting the conductive substance, means for moving the tape with respect to the brushes, a film having an electrically conductive substance at spaced points therealong, a second set of spaced brushes for contacting the conductive substance on the film, means for moving the film with respect to the second set of brushes, and means in circuit with said pairs of brushes for controlling said means for moving said tape and said means for moving said film to control the relative speeds of said tape and film moving means so that the sound from said tape is in synchronism with said film.

2. The system of claim 1 in which the pairs of brushes are longitudinally spaced in the direction of tape and film movement, and the spaced points of conductive substance are of sufficient length to cause said brushes to straddle same.

3. The system of claim 1 in which the pairs of brushes are transversely spaced with respect to the tape and film, and the spaced points of conductive substance are of sufficient width to cause said brushes to straddle same.

4. The system of claim 3 in which the pairs of brushes are constituted by a wheel divided into two conductive sections with an insulated section therebetween.

5. A system for synchronizing sound with a moving film comprising a sound producing tape having strips of an electrically conductive substance at spaced locations therealong, a pair of spaced brushes for successively contacting the strips of conductive substance, an electric motor for moving the tape with respect to the brushes, a film having strips of an electrically conductive substance at spaced locations therealong, said tape and film providing independently movable members, a second set of spaced brushes for successively contacting the strips of conductive substance on the film, an electric motor for moving the film with respect to the second set of brushes, a solenoid energizable by abridgment of a conductive strip on one of said members by a corresponding pair of brushes to de-energize the electric motor moving said one member, and a second solenoid energizable by abridgment of another conductive strip on the other member by the other pair of brushes to re-energize said one electric motor moving said one member.

6. In a dual sound system, a first system comprising a trio of spaced brushes, a sound producing tape having strips of an electrically conductive substance at spaced locations therealong of sufficient size to be bridged by a pair of said trio of brushes and a last strip of conductive substance of a greater size sufficient to be bridged by one of said pair of brushes and the third brush of said trio, an electric motor for moving the tape with respect to the brushes, a film having an electrically conductive substance at spaced points therealong, a pair of brushes for contacting the substance on the film, an electric motor for moving the film with respect to its brushes, means in circuit with said first and second pairs of brushes for controlling the relative speeds of said tape and film to maintain synchronism therebetween; and a second system comprising a second electric motor and an energizing circuit for said motor including said third brush of said trio and one of the other brushes constituting the trio.

7. In a dual film system, a first system comprising a trio of spaced brushes, a film having strips of an electrically conductive substance at spaced locations therealong of sufficient size to be bridged by a pair of said trio of brushes and a last strip of conductive substance of greater size sufficient to be bridged by one of said pair of brushes and the third brush of said trio, an electric motor for moving the film with respect to the brushes, a sound producing tape having an electrically conductive substance at spaced locations therealong, a pair of brushes for contacting the substance on the tape, an electric motor for moving the tape with respect to its brushes, means in circuit with said first and second pairs of brushes for controlling the relative speeds of said tape and film to maintain synchronism therebetween; and a second system comprising a second electric motor and an energizing circuit for said motor including said third brush of said trio and one of the other brushes constituting the trio.

8. A system for synchronizing sound with a moving film including a sound producing tape member, a film member, means at spaced points on each of said members cooperable with a source of current to produce electrical impulses at predetermined intervals, the impulses produced by both members normally being simultaneous when said members are moved at the same speed, independent means for moving each of said members, circuits to said moving means, and relay means in said circuits, said relay means being operable by an impulse created by either one of said members to open the circuit to the moving means of said one member and to retain the circuit to the moving means of the other member closed until the next succeeding spaced point means has moved into a cooperable position with said source of current.

9. The structure described in claim 1 and including a third brush in spaced relation to the brushes of one pair and a normally inoperative circuit in conjunction therewith, means in said last named circuit to open the circuit to controlling said tape and film moving means, and additional electrically conductive material on said tape engageable with said third brushes and the brushes of said one pair.

References Cited in the file of this patent

UNITED STATES PATENTS

| Number | Name | Date |
|---|---|---|
| 1,700,833 | Engel | Feb. 5, 1929 |
| 1,826,786 | Hopkins | Oct. 13, 1931 |
| 2,087,289 | Mercer | July 20, 1937 |
| 2,279,119 | Freimann | Apr. 7, 1942 |
| 2,354,583 | Eddy | July 25, 1944 |
| 2,454,491 | Thompson | Nov. 23, 1948 |
| 2,479,868 | Rossman et al. | Aug. 23, 1949 |
| 2,526,516 | Supitilov | Oct. 17, 1950 |

FOREIGN PATENTS

| Number | Country | Date |
|---|---|---|
| 696,527 | France | Oct. 14, 1930 |